(12) United States Patent
Miyake

(10) Patent No.: US 8,556,437 B2
(45) Date of Patent: Oct. 15, 2013

(54) SEMICONDUCTOR LIGHT SOURCE APPARATUS AND LIGHTING UNIT

(75) Inventor: Yasuyuki Miyake, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 348 days.

(21) Appl. No.: 12/972,056

(22) Filed: Dec. 17, 2010

(65) Prior Publication Data

US 2011/0149549 A1    Jun. 23, 2011

(30) Foreign Application Priority Data

Dec. 17, 2009   (JP) .................................. 2009-286397
Dec. 18, 2009   (JP) .................................. 2009-287559

(51) Int. Cl.
  *F21V 9/16*   (2006.01)
(52) U.S. Cl.
  USPC ....... 362/84; 362/283; 362/284; 257/E33.061
(58) Field of Classification Search
  USPC .......... 362/2, 19, 84, 285, 293; 313/502–504; 257/98, E33.061; 428/690
  See application file for complete search history.

(56) References Cited

U.S. PATENT DOCUMENTS

| 7,382,091 | B2 * | 6/2008 | Chen et al. ..................... 313/512 |
| 8,294,357 | B2 * | 10/2012 | Washizu et al. ............... 313/501 |
| 2005/0269582 | A1 | 12/2005 | Mueller et al. | |
| 2011/0116253 | A1 * | 5/2011 | Sugiyama ....................... 362/84 |

FOREIGN PATENT DOCUMENTS

| JP | 2004-55360 A | 2/2004 |
| JP | 2004-341105 A | 12/2004 |
| JP | 2006-005367 A | 1/2006 |

* cited by examiner

*Primary Examiner* — John A Ward
(74) *Attorney, Agent, or Firm* — Kenealy Vaidya LLP

(57) ABSTRACT

A semiconductor light source apparatus can emit various color lights having high brightness. The semiconductor light source apparatus can include a radiating substrate, at least one phosphor layer disposed on the radiating substrate and a semiconductor light source. The at least one phosphor layer can be composed of at least one of a glass phosphor and a phosphor ceramic and can include at least one of a red phosphor, a green phosphor and a blue phosphor. The light source can be located adjacent the phosphor layer so that light having high brightness emitted from the light source can be efficiently reflected on the radiating substrate via the at least one phosphor layer. Thus, the disclosed subject matter can provide a semiconductor light source apparatus that can emit various color lights having high brightness and a lighting unit using the light source apparatus, which can be used for general lighting, etc.

24 Claims, 17 Drawing Sheets

SEMICONDUCTOR LIGHT SOURCE APPARATUS AND LIGHTING UNIT

This application claims the priority benefit under 35 U.S.C. §119 of Japanese Patent Application No. 2009-286397 filed on Dec. 17, 2009 and Japanese Patent Application No. 2009-287559 filed on Dec. 18, 2009, both of which are hereby incorporated in their entireties by reference.

BACKGROUND

1. Field

The presently disclosed subject matter relates to a semiconductor light source apparatus and a lighting unit using the semiconductor light source apparatus, and more particularly to a high power semiconductor light source apparatus including a phosphor layer that can prevent a reduction of brightness caused by thermal quenching and a lighting unit that can also emit various color lights having a large amount of light intensity in order to be able to be used for general lighting, a stage light, a street light, a projector, etc.

2. Description of the Related Art

Semiconductor light source apparatuses that emit various color lights by combining a phosphor layer with a semiconductor light-emitting device such as an LED have been used for business machines, home electronics, etc. Recently, because brightness of the semiconductor light source apparatuses have improved, a range of application for the semiconductor light source apparatuses has expanded to fields such as general lighting, street lighting, a vehicle headlighting, etc.

One method for improving the brightness of the semiconductor light source apparatuses including the phosphor layer, includes providing an excitation intensity of the phosphor layer that is enhanced by flowing a large current in the semiconductor light-emitting device. However, because heat occurs in the phosphor layer due to the large current, the transparent resin can be tarnished. Because the transparent resin is mixed in the phosphor layer, the tarnish of the transparent resin results in absorption of a part of light excited by the phosphor layer, and therefore may cause a reduction of the excitation intensity.

In addition, a reduction of a fluorescent intensity may be caused by a thermal quenching property of the phosphor layer due to the large current. The thermal quenching property is a phenomenon in which a fluorescent intensity of a phosphor becomes reduced when the phosphor is heated at a high temperature. Therefore, because the tarnish of the transparent resin and the reduction of the fluorescent intensity cause a reduction of a light intensity in semiconductor light source apparatuses that include a phosphor layer, it is difficult to improve the brightness of the semiconductor light source apparatuses by simply flowing a large current.

To improve such a problem, a semiconductor light source apparatus using a phosphor layer that includes a phosphor particle without a transparent resin is disclosed in Patent Document No. 1 (Japanese Patent Application Laid Open JP2006-005367). FIG. 1 is a schematic structural view showing a conventional semiconductor light source apparatus including a phosphor layer, which is disclosed in Patent Document No. 1.

The conventional semiconductor light source apparatus includes a semiconductor light-emitting device 95 and a phosphor ceramic layer 92 including a phosphor particle without a transparent resin. The phosphor ceramic layer 92 may not include a transparent resin, and therefore a tarnish of the phosphor ceramic layer 92 may not occur. In addition, because the phosphor ceramic layer 92 is made of a material having a low thermal sensitivity, a thermal quenching may be prevented. Consequently, it may be possible for this semiconductor light source apparatus to improve brightness by simply flowing a large current therethrough.

However, in the conventional semiconductor light source apparatus, after light emitted from the semiconductor light-emitting device 95 is wavelength-converted via the phosphor ceramic layer 92, the light is emitted in the opposite direction of the semiconductor light-emitting device 95. Accordingly, light reflected on the phosphor ceramic layer 92 of the light emitted from the semiconductor light-emitting device 95 may return to the semiconductor light-emitting device 95 and may be absorbed in the semiconductor light-emitting device 95. The reflected light may cause a reduction of light use efficiency.

Moreover, heat generated from the phosphor ceramic layer 92 may be transmitted to the semiconductor light-emitting device 95 and may be radiated from a mounting substrate, on which the semiconductor light-emitting device 95 is mounted. However, because the semiconductor light-emitting device 95 also generates heat, a radiating efficiency of the semiconductor light source apparatus may not be high.

A conventional semiconductor light source apparatus including a phosphor wheel is disclosed in Patent Document No. 2 (U.S. patent application Ser. No. 12/949,776 filed on Nov. 18, 2010). This conventional semiconductor light source apparatus can improve a radiating efficiency of a phosphor layer that is applied on the phosphor wheel by rotating the phosphor wheel. In addition, a transmission type light source apparatus that may enhance the radiating efficiency by locating the phosphor layer on a metallic substrate is disclosed. However, because the phosphor layer includes a phosphor particle in a transparent resin, when a high power light source device is used for the semiconductor light source apparatus for many years, a degradation of the transparent resin may occur.

The above-referenced Patent Documents are listed below and are hereby incorporated with their English abstracts in their entireties.

1. Patent document No. 1: Japanese Patent Application Laid Open JP2006-005367
2. Patent document No. 2: U.S. application Ser. No. 12/949,776 filed on Nov. 18, 2010 and owned by Applicant of the present application.

The disclosed subject matter has been devised to consider the above and other problems, characteristics and features. Thus, an embodiment of the disclosed subject matter can include semiconductor light source apparatuses which can emit various color lights having high brightness and can efficiently radiate a heat even when a high power semiconductor light-emitting device is used under a large current as a light source. In this case, light emitted from a high power semiconductor light-emitting device can be efficiently wavelength-converted by a phosphor layer without a reduction of light intensity, because the phosphor layer is located on a radiating substrate and does not include a substantially resin component.

In addition, the phosphor layer can be constructed as a phosphor wheel that can rotate to further improve a radiating efficiency and permanence of the phosphor layer even when the high power semiconductor light-emitting device is used under a large current. In this case, the semiconductor light source apparatus can also adjust a color tone of the illumination light having a large amount of light intensity by connecting a moving module to a motor of the phosphor wheel, and therefore can be employed for various lighting units such as general lighting, a stage light, a street light, a projector, etc.

SUMMARY

The presently disclosed subject matter has been devised in view of the above and other characteristics, desires, and problems in the conventional art. An aspect of the disclosed subject matter can include providing a semiconductor light source apparatus having high brightness, in which various color lights having a large amount of light intensity can be emitted by reflecting on a radiating substrate that can radiate heat generated from a phosphor layer. Another aspect of the disclosed subject matter can include providing adjustable semiconductor light source apparatuses, in which a color tone of an illumination light having a large amount of light intensity can be adjusted by changing a distance between an intersection of an optical axis of a semiconductor light source and a mounting surface of the radiating substrate and a rotation axis of the radiating substrate. Another aspect of the disclosed subject matter can include providing lighting units using the semiconductor light source apparatus, which can be used for various lighting units such as general lighting, a stage light, a street light, a projector, etc.

According to one aspect of the disclosed subject matter, a semiconductor light source apparatus can include: a radiating substrate having a mounting surface; at least one phosphor layer disposed on the mounting surface of the radiating substrate via an adhesive material, and the at least one phosphor layer composed of at least one of a glass phosphor and a phosphor ceramic which do not include a substantially resin component; and a semiconductor light source having an optical axis and a light-emitting area, and located adjacent to the at least one phosphor layer. In this case, the optical axis of the semiconductor light source can intersect with the mounting surface at an angle while the light-emitting area of the semiconductor light source can be located on the at least one phosphor layer to wavelength-convert light emitted from the semiconductor light source by the at least one phosphor layer, and wherein the optical axis of the semiconductor light source can vary in a direction toward the at least one phosphor layer after being reflected on the radiating substrate or the adhesive material In the above-described exemplary light source apparatus, the semiconductor light source can be a blue light-emitting device and the at least one phosphor layer can be a yellow phosphor ceramic or two phosphor layers of a red phosphor layer and a green phosphor layer. In addition, the semiconductor light source can be an ultraviolet light-emitting device and the at least one phosphor layer can include at least one of a red phosphor, a green phosphor and a blue phosphor.

According to the above-described exemplary semiconductor light source apparatuses, even when a high power semiconductor light-emitting device is used under a large current as the semiconductor light source, light emitted from the high power semiconductor light-emitting device can be efficiently wavelength-converted by the at least one phosphor layer without a reduction of light intensity, because the at least one phosphor layer is located on the radiating substrate via the adhesive material and does not include a substantially resin component. Thus, the semiconductor light source apparatuses can emit various color lights having high brightness including white light.

According to another aspect of the disclosed subject matter, the semiconductor light source apparatus can include: a motor having a rotation axis; a radiating substrate having a mounting surface and a rotation axis, and the rotation axis of the substrate being connected to the rotation axis of the motor so that the mounting surface can be rotated at a substantially right angle to the rotation axis of the radiating substrate by the motor; at least one phosphor layer disposed on the mounting surface via an adhesive material and composed of at least one of a glass phosphor and a phosphor ceramic which do not include a substantially resin component; and a semiconductor light source having an optical axis and a light-emitting area, and located adjacent to the at least one phosphor layer. In addition, the optical axis of the semiconductor light source can intersect with the mounting surface at an angle while the light-emitting area of the semiconductor light source can be located on the at least one phosphor layer, and wherein the optical axis of the semiconductor light source can vary in a direction toward the at least one phosphor layer after being reflected on the radiating substrate or the adhesive material.

In this case, the semiconductor light source apparatus can further include a moving module being connected to the motor so that a distance between the rotation axis of the radiating substrate and an intersection of the optical axis of the semiconductor light source and the mounting surface can be adjusted by the moving module. The semiconductor light source can be an ultraviolet light-emitting device and the at least one phosphor layer can be configured with a red phosphor layer, a green phosphor layer and a blue phosphor layer that are formed in a fan shape, respectively, and wherein a ratio of an arc on the red phosphor layer to an arc on the blue phosphor layer varies according to an intersection of the arc and a boundary between the red phosphor layer and the blue phosphor layer when writing the arc with respect to the rotation axis of the substrate. Moreover, the at least one phosphor layer can also be configured with a red phosphor layer, a green phosphor layer and a blue phosphor layer that are respectively formed in a concentric fashion with respect to the rotation axis of the substrate, and wherein the green phosphor layer is located between the red phosphor layer and the blue phosphor layer.

In the immediately above-described exemplary semiconductor light source apparatuses, a color tone of an illumination light having a large amount of light intensity can be adjusted by changing the distance between the intersection of the optical axis of the semiconductor light source and the mounting surface and the rotation axis of the radiating substrate. In addition, the blue phosphor layer can be eliminated by replacing the ultraviolet light-emitting device with a blue light-emitting device. In this case, the semiconductor light source apparatus can efficiently use blue light that is not excited by the red and green phosphor layers with a cutout section, which exposes a part of the radiating substrate from the red and green phosphor layers.

According to the above-described exemplary semiconductor light source apparatus, the color tone of light emitted from the semiconductor light source apparatus can be adjusted by the moving module for changing the distance between the intersection of the optical axis of the semiconductor light source and the mounting surface and the rotation axis of the radiating substrate because the light source apparatus can vary a ratio of mixing lights for white light according to the distance. Moreover, a high power semiconductor light-emitting device can be used under the large current as the light source due to a radiating effective by a rotation of the radiating substrate. Thus, the semiconductor light source apparatus can adjust a color tone of an illumination light having a large amount of light intensity.

According to another aspect of the disclosed subject matter, the semiconductor light source apparatus can include: a motor having a rotation axis; a radiating substrate having a rotation axis and including a cavity having a bottom surface, and the rotation axis of the radiating substrate being connected to the rotation axis of the motor so that the bottom surface of the cavity is rotated at a substantially right angle to the rotation axis of the radiating substrate; at least one glass phosphor layer disposed on the bottom surface of the cavity; and a semiconductor light source having an optical axis and a light-emitting area, and located adjacent to the at least one glass phosphor layer. In addition, the optical axis of the semiconductor light source can intersect with the bottom surface of the cavity at an angle while the light-emitting area of the semiconductor light source can be located on the at least one glass phosphor layer, and wherein the optical axis of the semiconductor light source can vary in a direction toward the at least one glass phosphor layer after being reflected on the bottom surface of the cavity.

In this case, because side surfaces of the at least one glass phosphor layer can be surrounded by walls of the cavity of the radiating substrate, light passing through the side surfaces of the at least one glass phosphor layer can reflect on the walls of the cavity and can be emitted in a direction toward a light-emission of the semiconductor light source apparatus. Therefore, the cavity can result in an improvement of a light use efficiency of the semiconductor light source. In addition, the structure including the cavity can prevent the at least one glass phosphor layer from peeling from the radiating substrate, which may be caused by a rotation of the radiating substrate. Moreover, the structure can allow a mass production at low cost because of a simple manufacturing method. The structure including the cavity can also be used for exemplary embodiments set forth in in the preceding paragraphs. Likewise, any of the different features from the various disclosed embodiments can be interchanged or exchanged with each other in order to provide additional embodiments.

According to another aspect of the disclosed subject matter, a lighting unit including a semiconductor light source apparatus according to one embodiment can further include a housing located so as to cover the semiconductor light source apparatus and a projector lens having an optical axis located adjacent the housing so that the optical axis of the projector lens corresponds to the substantially optical axis of the semiconductor light source.

In this case, the lighting units including the semiconductor light source apparatus can include the projector lens to form a light distribution in accordance with various usages. Thus, the disclosed subject matter can provide high power lighting units having high brightness and a favorable light distribution, which can be used for various lighting units such as general lighting, stage lighting, a street light, a projector, etc.

BRIEF DESCRIPTION OF THE DRAWINGS

These and other characteristics and features of the disclosed subject matter will become clear from the following description with reference to the accompanying drawings, wherein:

FIG. 2b is a top view showing a phosphor layer and a radiating substrate of the semiconductor light source apparatus shown in FIG. 2a;

FIG. 5b is a cross-sectional view depicting a cross-section taken along line A-A of the phosphor wheel shown in FIG. 5a;

FIG. 6b is a cross-sectional view depicting a cross-section taken along line A-A of the phosphor wheel shown in FIG. 6a;

FIG. 7b is a cross-sectional view depicting a cross-section taken along line A-A of the phosphor wheel shown in FIG. 7a;

FIG. 8b is a cross-sectional view depicting a cross-section taken along line A-A of the phosphor wheel shown in FIG. 8a;

FIG. 9b is a cross-sectional view depicting a cross-section taken along line A-A of the phosphor wheel shown in FIG. 9a;

FIG. 10B is a top view showing a phosphor wheel of the fifth variation of FIG. 10a;

FIG. 13b is a schematic top view depicting a phosphor wheel of the third exemplary semiconductor light source shown in FIG. 13a;

DETAILED DESCRIPTION OF EXEMPLARY EMBODIMENTS

Figure 2A:
FIG. 2a is a schematic structural view showing a first exemplary embodiment of a semiconductor light source apparatus made in accordance with principles of the disclosed subject matter.
Figure 2A:
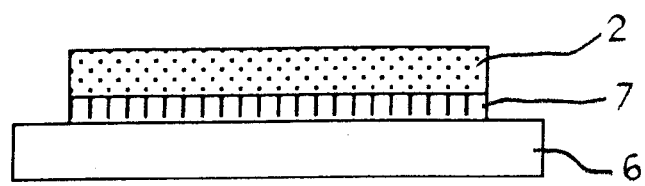
Figure 2B:
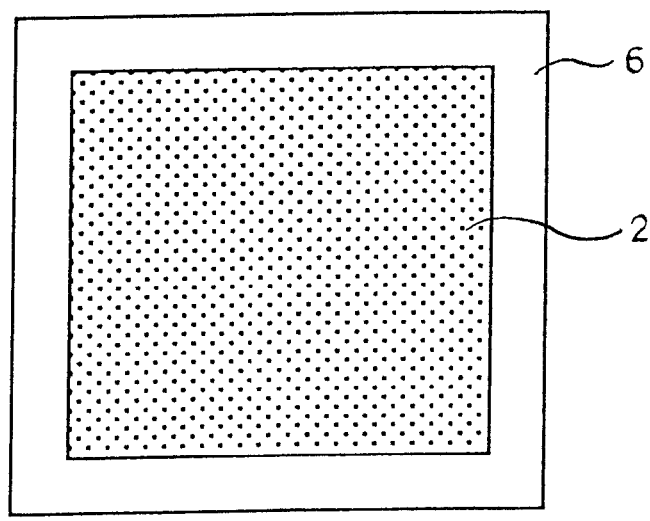

The disclosed subject matter will now be described in detail with reference to FIGS. 2 to 17, in which the same or corresponding elements use the same reference marks. FIG. 2a is a schematic structural view showing first exemplary embodiment of a semiconductor light source apparatus made in accordance with principles of the disclosed subject matter, and FIG. 2b is a top view showing a phosphor layer and a radiating substrate of the semiconductor light source apparatus shown in FIG. 2a.

A semiconductor light source apparatus 10 can include a semiconductor light source 5 configured to emit light having a light-emitting wavelength from an ultraviolet light to a visible light, and a phosphor layer 2 including at least one phosphor to wavelength-convert the light emitted from the semiconductor light source 5 into an excited light having a longer light-emitting wavelength than that of the light emitted from the semiconductor light source 5. The phosphor layer may not include a substantial amount of resin component, and may include no resin component at all.

The semiconductor light source 5 can be located adjacent to the phosphor layer 2, and a radiating substrate 6 can be located on the opposite side of the semiconductor light source 5. The phosphor layer 2 can be attached to the radiating substrate 6 via an adhesive material 7, which is composed of a material having a high thermal conductivity. The radiating substrate 6 can be used as a reflector, which reflects the excited light by the phosphor layer 2 in a direction toward the phosphor layer 2.

Figure 1:
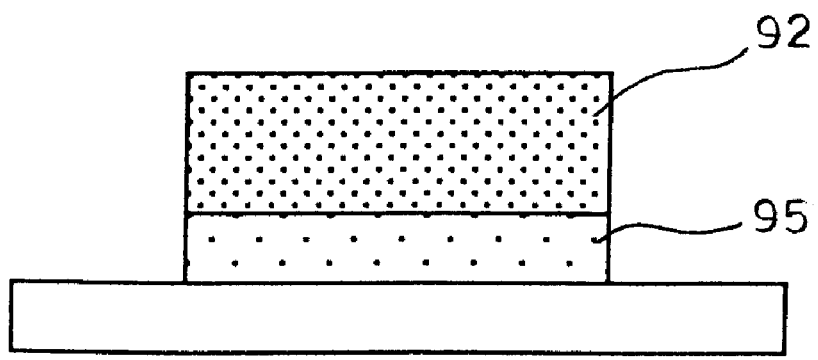
FIG. 1 is a schematic structural view showing a conventional semiconductor light source apparatus using a phosphor ceramic layer that includes a phosphor particle without a transparent resin.

Therefore, the semiconductor light source apparatus 10 can emit the excited light via the radiating substrate 6 as a reflection type light source apparatus. On the contrary, because the conventional light source apparatus shown in FIG. 1 is a transmission type light source apparatus, the semiconductor light source 95 is located between the phosphor ceramic layer 92 and the mounting substrate. Accordingly, the radiating efficiency of the phosphor ceramic layer 92 may be low because the phosphor ceramic layer 92 is located on the semiconductor light source 95, which generates a large amount of heat.

However, in the semiconductor light source apparatus 10 of the disclosed subject matter, the semiconductor light source 5 can be located away from the phosphor layer 2. In addition, because the phosphor layer 2 can be located on the radiating substrate 6 via the adhesive material 7 having a high thermal conductivity, even when the semiconductor light source 5 transmits a large amount of heat to the phosphor layer 2 by flowing a large current in the semiconductor light source 5, the heat of the phosphor layer can be radiated from the radiating substrate 6 via the adhesive material 7.

Moreover, in the conventional light source apparatus shown in FIG. 1, because light reflected on the phosphor ceramic layer 92 may be absorbed in the semiconductor light source 95, the light use efficiency may decrease. Furthermore, a thickness of the phosphor ceramic layer 92 needs to be thickened in order to emit light having a prescribed chromaticity because the conventional light source apparatus is a transmission type light source apparatus. Accordingly, it may become further difficult to radiate the heat of the phosphor ceramic layer 92 from the mounting substrate via the semiconductor light source 95.

On the other hand, because the semiconductor light source apparatus 10 shown in FIG. 2a can reflect light emitted from the semiconductor light source 5 via the radiating substrate 6, the light emitted from the semiconductor light source 5 can hardly be absorbed in the radiating substrate 6. Consequently, a light use efficiency of the semiconductor light source 5 can be maintained in a high state. In addition, the reflection type semiconductor light source apparatus 10 can allow thinning of a thickness of the phosphor layer 2 because light path lengths in the phosphor layer 2 can become long. Therefore, the radiating efficiency of the phosphor layer 2 can improve due to a thin phosphor layer.

Moreover, because the phosphor layer 2 does not include a substantially resin component, or includes no resin component, a tarnish of the phosphor layer 2 cannot be caused by a radiating heat transmitted from the semiconductor light source 5 even if the semiconductor light source 5 generates a large amount of radiating heat. Accordingly, the semiconductor light source apparatus 10 that can emit light having high brightness can be realized. The phosphor layer 2 that does not include a substantial amount of a resin component means that the resin component for forming the phosphor layer 2 is, for example, 5 wt percentages or less in the phosphor layer 2. As indicated above, the at least one phosphor layer 2 can consist essentially of (or consist of) at least one of a glass phosphor and a phosphor ceramic. Thus, in the phosphor layer 2 which does not include a substantial resin component, a tarnish of the phosphor layer 2 by a radiating heat can be prevented.

The phosphor layer 2 can be made by dispersing a phosphor powder in a glass, and also a glass phosphor that adds a light-emitting ion into a glass and a phosphor ceramic that is composed of a single crystal phosphor or a poly crystal phosphor can be used as the phosphor layer 2. The phosphor ceramic can be made by forming a phosphor in a predetermined shape and by burning the phosphor. In the case, even when an organic material is used as a binder in a manufacturing process for the phosphor layer 2, because the organic component is burnt in a degreasing process after the forming process, the phosphor ceramic can include only the resin component of 5 wt percentages or less.

Therefore, because the above-described phosphor layer 2 does not include a substantial resin component and can be composed of only inorganic materials, the tarnish is prevented in the phosphor layer 2 due to the heat generated from the semiconductor light source 5. In addition, the glass phosphor can have a high thermal conductivity in general, and therefore the radiating efficiency of the phosphor layers 2 that is composed of the glass phosphor can become high. Moreover, because the phosphor ceramic can generally have a higher thermal conductivity than that of the glass phosphor and a manufacturing cost for the poly crystal phosphor ceramic may be lower than that for the single crystal phosphor ceramic, the poly crystal phosphor ceramic can be used as the phosphor layer 2.

The phosphor layer 2 can include at least one phosphor that wave-converts the light emitted from the semiconductor light source 5 into light having a prescribed wavelength. For example, when the phosphor layer 2 includes a red phosphor wavelength-converting ultraviolet light into red light, a green phosphor wavelength-converting the ultraviolet light into green light and a blue phosphor wavelength-converting the ultraviolet light into blue light and when the semiconductor light source 5 emits the ultraviolet light, the semiconductor light source apparatus 10 can emit substantially white light due to an additive color mixture using lights excited by the three phosphors.

When the phosphor layer 2 includes a red phosphor wavelength-converting blue light into purple light and a green phosphor wavelength-converting the blue light into blue-green light and when the semiconductor light source 5 emits the blue light, the semiconductor light source apparatus 10 can also emit substantially white light due to an additive color mixture using lights excited by the two phosphors and a part of the blue light that is not excited by the phosphors.

In addition, when the phosphor layer 2 includes a yellow phosphor wavelength-converting the blue light into yellow light and when the semiconductor light source 5 emits the blue light, the semiconductor light source apparatus 10 can emit substantially white light due to an additive color mixture using light excited by the yellow phosphor and a part of the blue light that is not excited by the yellow phosphor.

The radiating substrate 6 can operate as a reflector that reflects light excited by the phosphor layer 2, and that part of the light not excited by the phosphor layer 2, and can operate as the radiator, which radiates heat generated from the phosphor layer 2. Accordingly, a metallic substrate such as aluminum, an oxide ceramic such as an alumina and a non oxide ceramic such as an aluminum nitride can be used as the radiating substrate 6 because these materials have a high reflectivity, a high thermal conductivity and a high workability.

As the adhesive material 7 for attaching the phosphor layer 2 to the radiating substrate 6, an organic adhesive material, an inorganic adhesive material, a low-melting-point glass, a metallic brazing can be used. For example, silver brazing having a high reflectivity and a high thermal conductivity can be used as the adhesive material 7.

As the semiconductor light source 5, an LED of InGaN series that emits near-ultraviolet light having a light-emitting wavelength of approximately 380 nanometers can be used. A laser diode that emits ultraviolet light can also be used as the semiconductor light source 5. In this case, $CaAlSiN_3:Eu^{2+}$, $Ca_2Si_5N_8:Eu^{2+}$, $La_2O_2S:Eu^{3+}$, $KSiF_6: Mn^{4+}$, $KTiF_6:Mn^{4+}$ and the like can be used as the red phosphor of the phosphor layer 2. $(Si, Al)_6 (O, N):Eu^{2+}$, $BaMgAl_{10}O_{17}:Eu^{2+}Mn^{2+}$, $(Ba, Sr)_2SiO_4:Eu^{2+}$ and the like can be used as the green phosphor. $(Sr, Ca, Ba, Mg)_{10}(PO_4)_6C_{12}:Eu^{2+}$, $BaMgAl_{10}O_{17}:Eu^{2+}$, $LaAl(Si,Al)_6(N, O)_{10}:Ce^{3+}$ can be used as the blue phosphor.

As the semiconductor light source 5, an LED of GaN series that emits blue light having a light-emitting wavelength of approximately 460 nanometers can be used, and also a laser diode that emits blue light can be used. In this case, $CaAlSiN_3:Eu^{2+}$, $Ca_2Si_5N_8:Eu^{2+}$, $La_2O_2S:Eu^{3+}$, $KSiF_6: Mn^{4+}$, $KTiF_6:Mn^{4+}$ and the like can be used as the red phosphor of the phosphor layer 2. $Y_3(Ga, Al)_5O_{12}:Ce^{3+}$, $Ca_3Sc_2Si_3O_{12}:Ce^{3+}$, $CaSc_2O_4:Eu^{2+}$, $(Ba, Sr)_2SiO_4:Eu^{2+}$, $Ba_3Si_6O_{12}N_2:Eu^{2+}$, $(Si, Al)_6 (O, N):Eu^{2+}$ and the like can be used as the green phosphor. As the yellow phosphor, $Y_3Al_5O_{12}:Ce^{3+}$ (YAG), $(Sr, Ba)_2 SiO_4:Eu^{2+}$, $Ca_x (Si, Al)_{12} (O, N)_{16}:Eu^{2+}$ and the like can be used.

As the phosphor layer 2 that disperses the phosphor powder in the glass, a glass phosphor that disperses each phosphor powder of the above-described phosphors in a glass including an oxide component such as $P_2O_3$, $SiO_2$, $B_2O_3$, $Al_2O_3$ and the like can be used. As the phosphor layer 2 that adds the light-emitting ion into the glass, a nitride glass phosphor that adds an activator such as $Ce^{3+}$ and $Eu^{2+}$ in a nitride glass such Ca—Si—Al—O—N series, Y—Si—Al—O—N series and the like can be used.

The phosphor ceramic can be manufactured in order of a mixing process of raw materials, a forming process, a burning process and a fabricating process. When a phosphor ceramic of YAG phosphor for the yellow phosphor is produced, oxides of constituent element of YAG phosphor such as yttrium oxide, cerium oxide, alumina, etc. and carbonate, nitrate salt, hydrosulfate and the like that become an oxide after the burning can be used as raw materials so that each of the raw materials becomes a stoichiometric proportion with respect to each other.

In this case, a chemical compound of calcium, silicon and the like can be added for the purpose of an improvement of transmission of the phosphor ceramic after the burning. The raw materials can be dispersed in water or an organic solvent and can be mixed by a wet ball mill. Next, the mixed raw materials can be formed in a predetermined shape. A uniaxial pressure method, a cold isostatic pressure method, a slip casting method, a mold injection and the like can be used as the forming method. The transparent YAG phosphor ceramic can be produced by burning the formed material at 1,600 to 1,800 degrees centigrade.

The above-described phosphor ceramic can be polished by polishing equipment so as to have a thickness of several multiples of ten micrometers to several hundred micrometers, a plate such as a round shape, a square shape, a fan shape, a rig shape and the like can be cut off by a scriber, dicer, etc. The phosphor ceramic can have a high reflectivity and can be easy to guide light in an extending direction of the plate. Accordingly, the phosphor ceramic can easily emit the light in a direction toward a surface thereof by roughing the surface of the phosphor ceramic by etching and by forming side surfaces of the phosphor ceramic as reflecting surfaces.

The transparent phosphor ceramic can have a high thermal conductivity, and therefore can easily radiate the heat generated from the phosphor layer 2 via the radiating substrate 6. As the radiating substrate 6, an oxide ceramic, a non-oxide ceramic, a metallic plate and the like can be used. Especially, a metallic plate having a high reflectivity can be used, to provide a high thermal conductivity and a high workability to the radiating substrate 6. As the metallic plate of the radiating substrate 6, Al, Cu, Ti, Si, Ag, Au, Ni, Mo, W, Fe, Pd and the like and an alloy including at least one of the above-described metallic elements can be used. The radiating substrate 6 can be provided with a fin to improve the radiating efficiency.

As the adhesive material 7, the organic adhesive material, the inorganic adhesive material, the low-melting-point glass, the metallic brazing can be used. The metallic brazing having a high reflectivity and a high thermal conductivity can be realized by forming a metallic layer on a surface of the phosphor ceramic and by brazing between the metallic layer and the metallic surface of the radiating substrate 6.

The metallic layer on the phosphor ceramic can be formed by a vacuum vapor deposition method, a spattering method, a high-melting-point metal method, etc. The high-melting-point metal method is a forming method, in which an organic binder including a metallic particle is applied on the surface of the phosphor ceramic and is heated at 1,000 to 1,700 degrees centigrade under a reductive atmosphere including water vapor and mercury. In this case, Si, Nb, Ti, Zr, Mo, Ni, Mn, W, Fe, Pt, Al, Au, Pd, Ta, Cu and an alloy including at least one of the metallic elements can be used as the metallic layer. As the metal brazing material, a brazing material including Ag, Cu, Zn, Ni, Sn, Ti, Mn, In, Bi and the like can be used.

Figure 3:
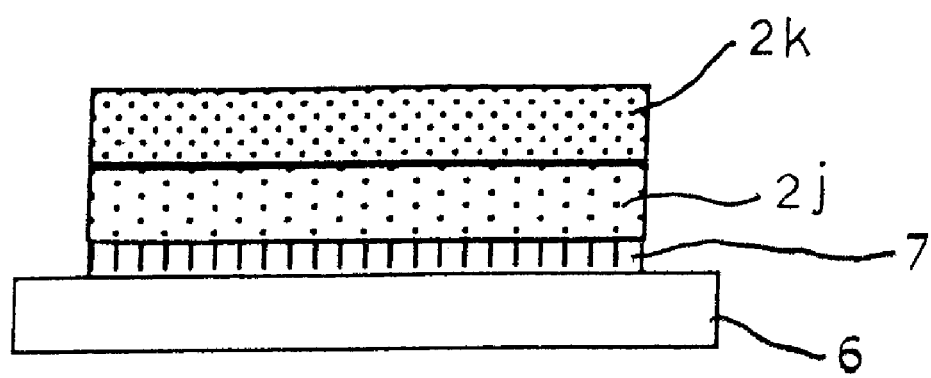
FIG. 3 is a front view depicting a phosphor layer of an exemplary variation of the first exemplary semiconductor light source apparatus.

The semiconductor light source apparatus 10 shown in FIG. 2a can include a single phosphor layer 2. However, the semiconductor light source apparatus 10 of the disclosed subject matter can include a plurality of phosphor layers. For example, as shown in FIG. 3, the phosphor layer 2 can include the green phosphor layer 2j and the red phosphor layer 2k. In this case, when the semiconductor light source 5 emits blue light, the semiconductor light source apparatus 10 can emit substantially white light due to an additive color mixture using lights excited by the green and red phosphor layer 2j, 2k and a part of the blue light that is not excited by the phosphor layers 2j and 2k.

As described above, the phosphor layer 2 can include at least one of the red phosphor, the green phosphor, the blue phosphor and the yellow phosphor, and the semiconductor light source 5 can emit at least one of the ultraviolet light and the blue light. Accordingly, the semiconductor light source device 10 can emit various color lights by combining the phosphor layer 2 with the semiconductor light source 5. In addition, because the phosphor layer 2 cannot include the substantially resin component and can be efficiently radiated from the radiating substrate 6 via the adhesive material 7, a high power semiconductor light source such as a laser diode can be used under a large current as the semiconductor light source 5. Thus, the disclosed subject matter can provide semiconductor light source apparatuses that can emit various color lights having a large amount of light intensity.

Figure 4:
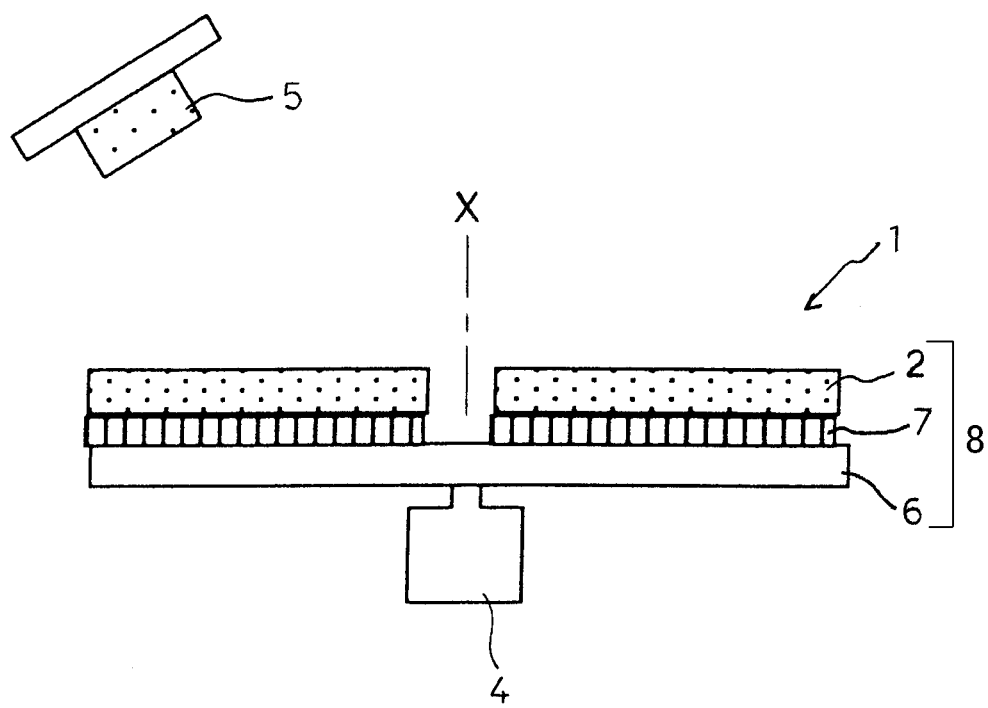
FIG. 4 is a schematic structural view showing a second exemplary embodiment of a semiconductor light source apparatus made in accordance with principles of the disclosed subject matter.
Figure 5A:
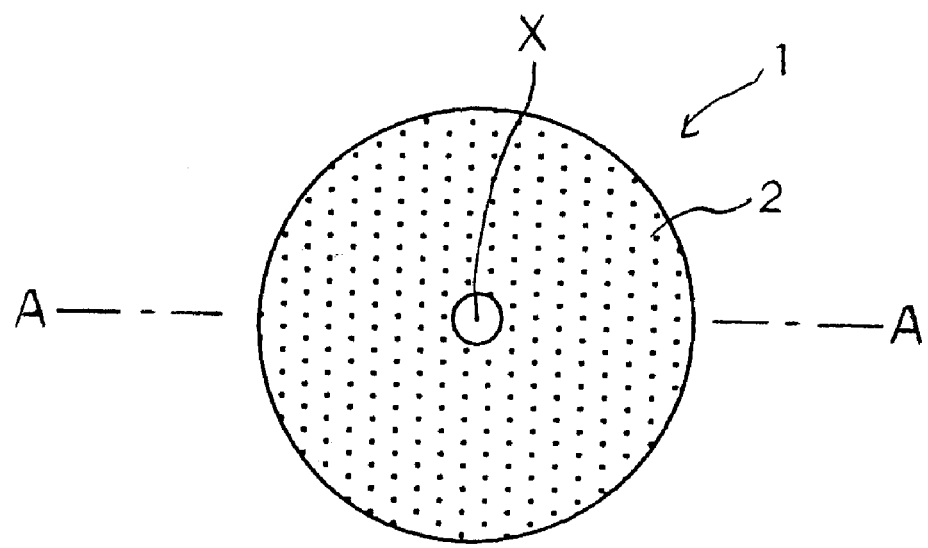
FIG. 5a is a schematic top view showing a phosphor wheel of the second exemplary semiconductor light source apparatus.
Figure 5B:
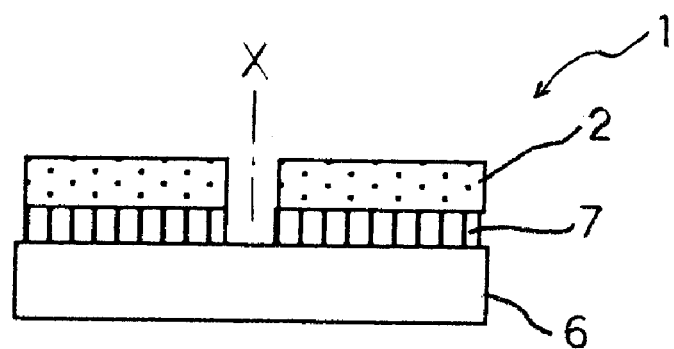

FIG. 4 is a schematic structural view showing a second exemplary embodiment of a semiconductor light source apparatus of the disclosed subject matter. FIGS. 5a and 5b are schematic top and front views showing a phosphor wheel of the second exemplary semiconductor light source apparatus. The semiconductor light source apparatus 1 in the second embodiment can include a rotary phosphor wheel 8 including the phosphor layer 2 and the radiating substrate 6.

Accordingly, the semiconductor light source apparatus 1 can further improve the radiating efficiency of the phosphor layer 2 as compared with the semiconductor light source apparatus 10 of the first embodiment. The semiconductor light source apparatus 1 can include: a motor 4 having a rotation axis; the phosphor layer 2; the radiating substrate 6 having a rotation axis X being connected to the rotation axis of the motor 4 so that the phosphor layer 2 can be rotated at a substantially right angle with the rotation axis X of the radiating substrate 6 by the motor 4; and a semiconductor light source 5 emitting ultraviolet light or blue light.

In this case, when the phosphor layer 2 includes the yellow phosphor wavelength-converting the blue light into yellow light, the semiconductor light source apparatus 1 can emit substantially white light due to an additive color mixture using light excited by the yellow phosphor and a part of the blue light that is not excited by the yellow phosphor. When the phosphor layer 2 include the red, green and blue phosphors and when the semiconductor light source 5 emits the ultraviolet light, the semiconductor light source apparatus 1 can also emit the substantially white light because of an additive color mixture of three primary colors.

Figure 6A:
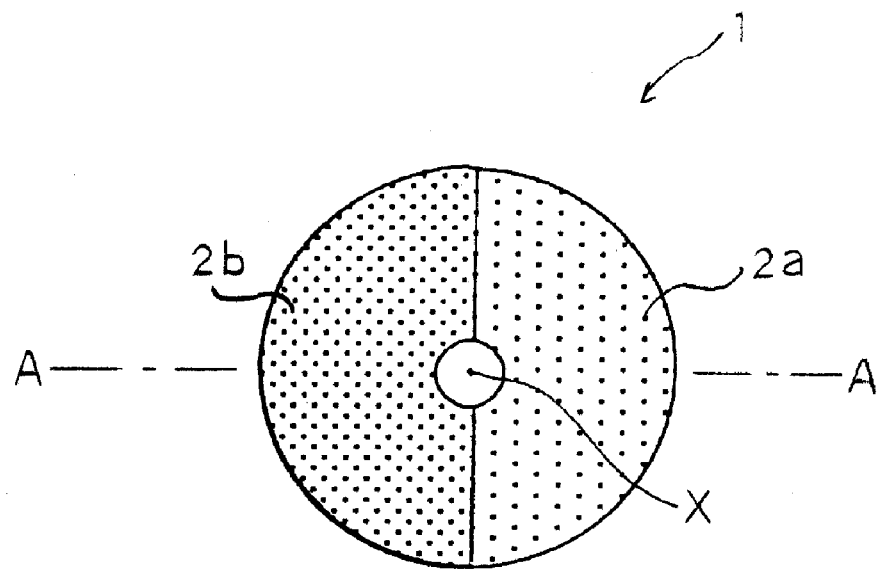
FIG. 6a is a schematic top view showing a phosphor wheel of a first variation of the second exemplary semiconductor light source apparatus.
Figure 6B:
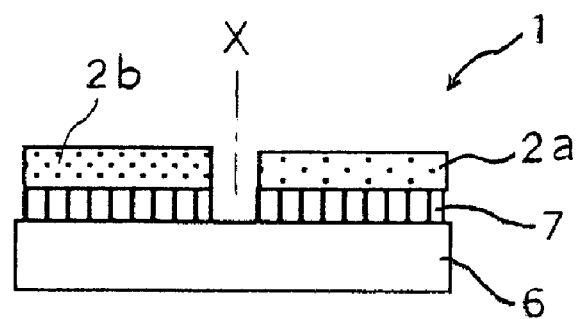

Variations of the second embodiment will now be described. The phosphor layer 2 can include a plurality of phosphor layers, for example, the phosphor layer 2 can include a red phosphor layer 2a and a green phosphor layer 2b, which are formed so as to divide the phosphor layer 2 into the two layers 2a and 2b as shown in FIGS. 6a and 6b. In this case, when the semiconductor light source 5 emits the blue light and the phosphor wheel 8 is rotated at a high speed (e.g. 3,600 rpm), the semiconductor light source apparatus 1 can emit the substantially white light with lights excited by the red and green phosphor layers 2a and 2b and a part of the blue light that is not excited by the phosphor layers 2a and 2b.

Figure 7A:
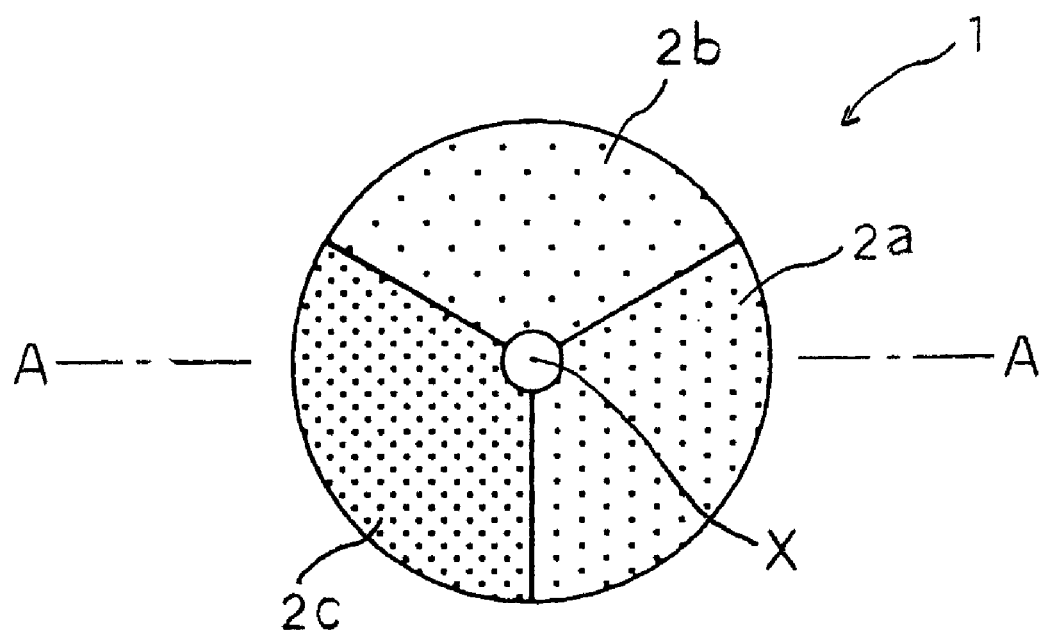
FIG. 7a is a schematic top view showing a phosphor wheel of a second variation of the second exemplary semiconductor light source apparatus.
Figure 7B:
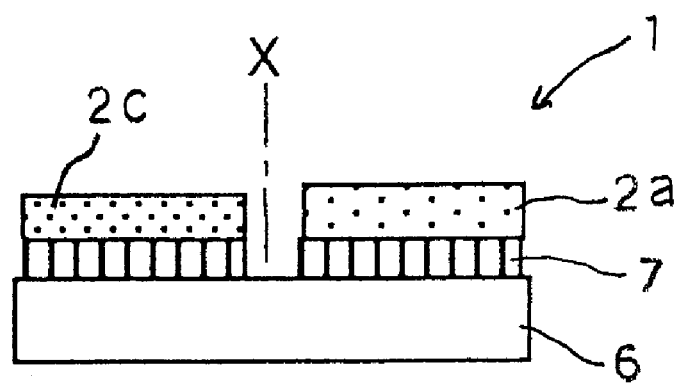

The phosphor layer 2 shown in FIGS. 7a and 7b can include a red phosphor layer 2a, a green phosphor layer 2b and a blue phosphor layer 2c, which are respectively formed in a fan shape so as to divide the phosphor layer 2 into the three layers 2a, 2b and 2c. When the semiconductor light source 5 emits the ultraviolet light and the phosphor wheel 8 is rotated at a high speed, the semiconductor light source apparatus 1 can emit substantially white light with light excited by the red, green and blue phosphor layers 2a, 2b and 2c.

Figure 8A:
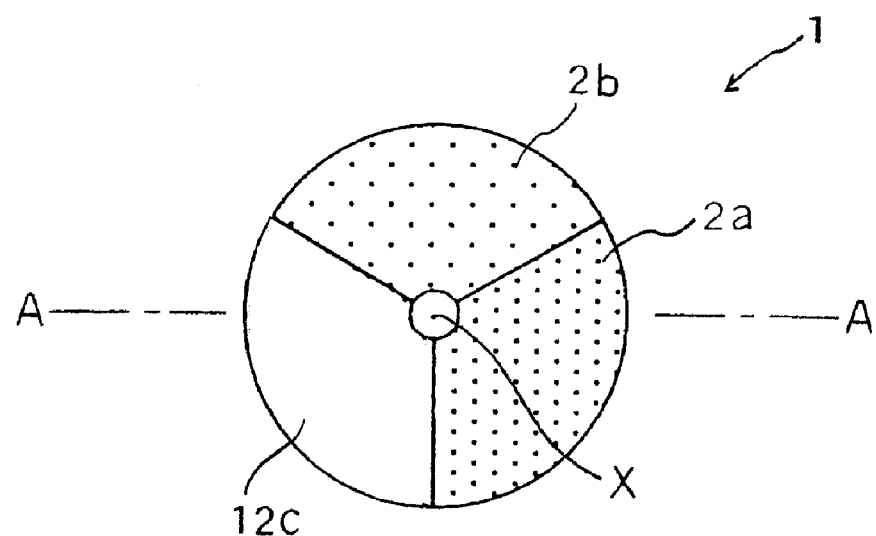
FIG. 8a is a schematic top view showing a phosphor wheel of a third variation of the second exemplary semiconductor light source apparatus.
Figure 8B:
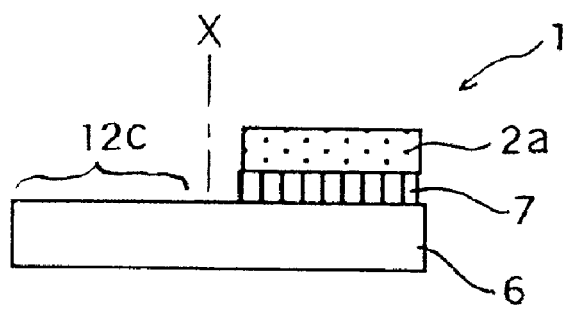

The phosphor layer 2 shown in FIGS. 8a and 8b can include the red phosphor layers 2a and the green phosphor layer 2b, which are respectively formed in a fan shape. A cutout section 12c of the phosphor layer 2 can expose a part of the radiating substrate 6 from the red and green phosphor layers 2a and 2b. In this case, when the semiconductor light source 5 emits the blue light and the phosphor wheel 8 is rotated at a high speed, the semiconductor light source apparatus 1 can emit the substantially white light with light excited by the red and green phosphor layers 2a and 2b and blue light reflected by the cutout section 12c, which expose the part of the radiating substrate 6. Therefore, the semiconductor light source 1 of the third variation can eliminate the blue phosphor layer 2c of the second variation while efficiently using the blue light that is not excited by the red and green phosphor layer 2a and 2b.

Figure 9A:
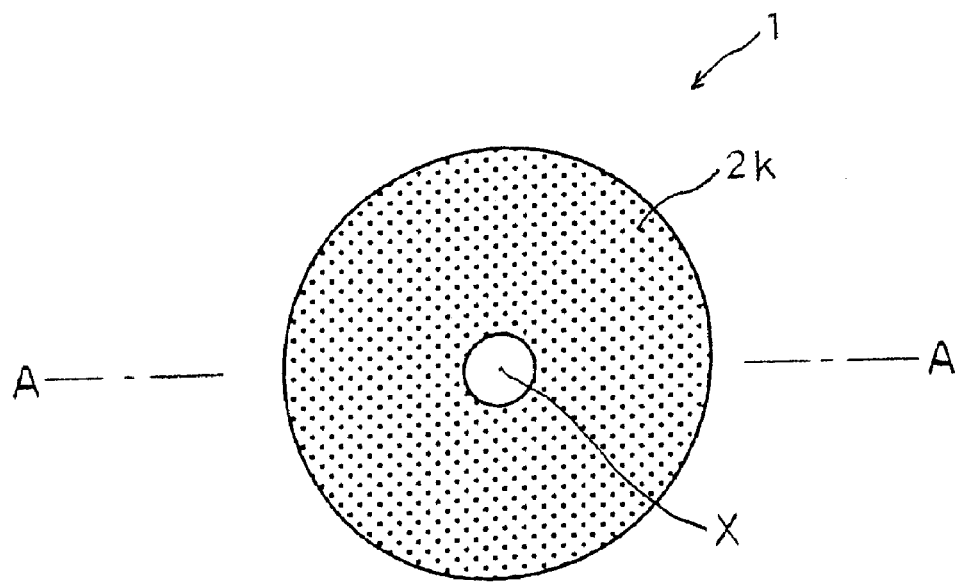
FIG. 9a is a schematic top view showing a phosphor wheel of a fourth variation of the second exemplary semiconductor light source apparatus.
Figure 9B:
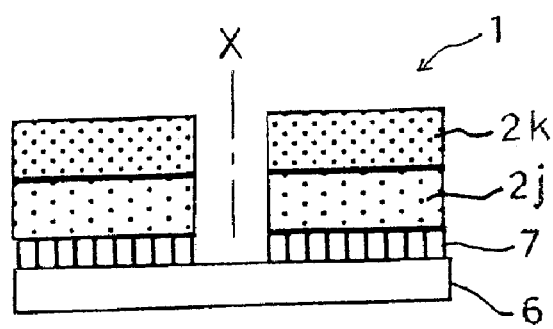

The phosphor layer 2 shown in FIGS. 9a and 9b can include a red phosphor layer 2k and a green phosphor layer 2j, which are formed in a two-layer structure. In this case, when the semiconductor light source 5 emits the blue light and the phosphor wheel 8 is rotated at a high speed, the blue light can excite the red and green phosphor layers 2k and 2j and a part of the blue light that is not excited by the two phosphor layers 2k and 2j can be reflected by the radiating substrate 6. Accordingly, the semiconductor light source apparatus 1 can emit substantially white light with light excited by the red and green phosphor layers 2k and 2j and the part of the blue light that is not excited by the phosphor layers 2k and 2j.

Figure 10A:
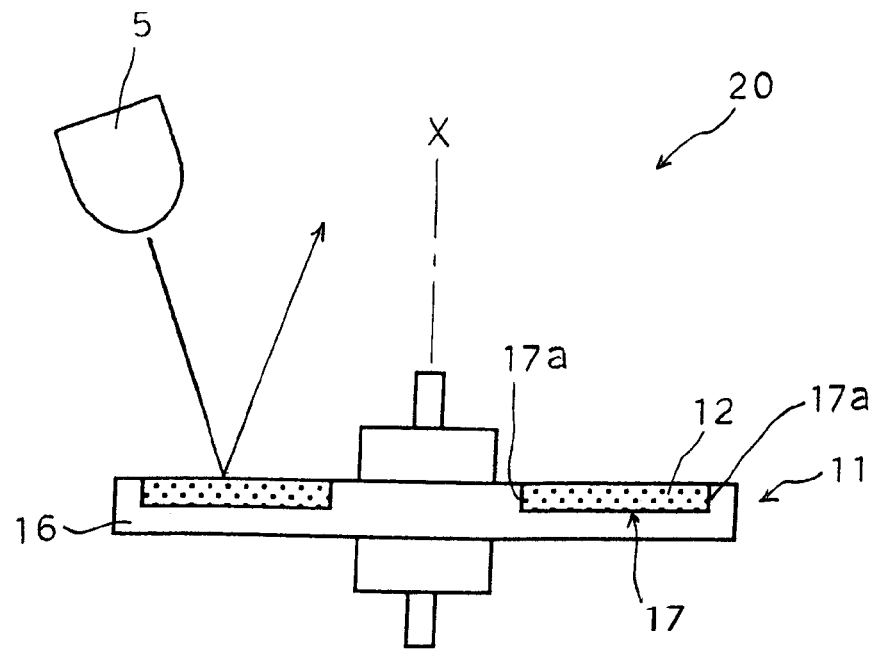
FIG. 10a is a schematic structural view showing a fifth variation of the second exemplary semiconductor light source apparatus.
Figure 10B:
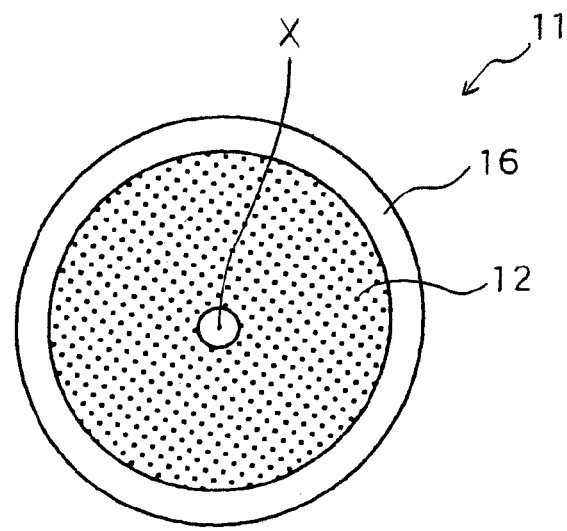

FIG. 10a is a schematic structural view showing a fifth variation of the second exemplary semiconductor light source apparatus, and FIG. 10B is a top view showing a phosphor wheel of the fifth variation of FIG. 10a. A phosphor wheel 11 can include a radiating substrate 16 including a cavity 17 that is formed in a ring shape and a phosphor layer 12 that is located in the cavity 17 of the radiating substrate 16.

Side surfaces of the phosphor layer 12 can be surrounded by walls 17a of the cavity 17 of the radiating substrate 16. Accordingly, light passing through the side surface of the phosphor layer 12 can reflect on the walls 17a of the cavity 17 and can be emitted in a direction toward a light-emission of a semiconductor light source apparatus 20. The walls 17a can be slanted so that a cross-sectional view of the cavity 17 can be formed in a concave shape, and therefore can improve a light use efficiency of the semiconductor light source 5 because the light that passes through the side surfaces of the phosphor layer 12 can be easily emitted in a direction towards the light-emission of the semiconductor light source apparatus 20.

In addition, the structure including the cavity 17 can prevent the phosphor layer 12 from peeling from the radiating substrate 16, which may be caused by a rotation of the phosphor wheel 11. Consequently, the semiconductor light source 20 can improve reliability while it can emit a large amount of light intensity. The cavity 17 of the radiating substrate 16 can be formed by etching, cutting, etc.

When the phosphor layer 12 is located in the cavity 17 of the radiating substrate 16, the phosphor layer 12 can be formed by disposing a melting glass including the above-described phosphor powder in the cavity 17 and by cooling the melting glass at normal temperature. When the phosphor layer 2 including a plurality of phosphor layers as shown in FIGS. 6a, 7a and 8a is formed by the glass ceramic, a separating wall can be provided between the adjacent different phosphor layers in the cavity 17. The manufacturing method can allow a mass production at low cost because of a simple manufacturing method. When the phosphor ceramic is disposed in the cavity 17 of the radiating substrate 16, the phosphor ceramic can be attached in the cavity 17 via the adhesive material 7.

When the phosphor layer 12 shown in FIGS. 10a and 10b includes the yellow phosphor wavelength-converting blue light emitted from the semiconductor light source 5 into yellow light, the semiconductor light source apparatus 20 can emit substantially white light with yellow light excited by the yellow phosphor and a part of the blue light that is not excited by the yellow phosphor by rotating the phosphor wheel 11 at a high speed. When the phosphor layer 12 includes the red, green and blue phosphors and when the semiconductor light source 5 emits the ultraviolet light, the semiconductor light source apparatus 20 can also emit substantially white light with the excited three color lights by rotating the phosphor wheel 11.

Figure 11:
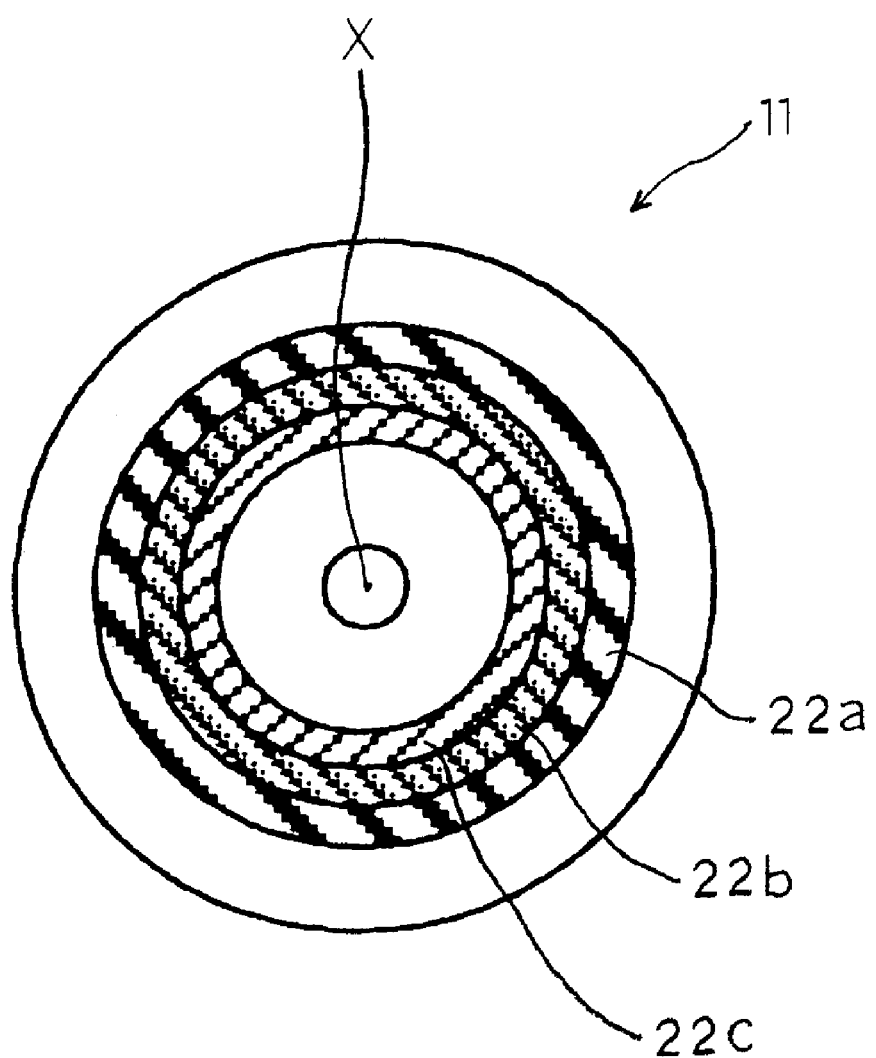
FIG. 11 is a schematic top view showing a phosphor wheel of a sixth variation of the second exemplary semiconductor light source apparatus.

The phosphor layer 2 of the second embodiment can include a plurality of phosphor layers formed in a concentric fashion with respect to the rotation axis X of the radiating substrate 16 which extends along a rotation axis structure such as a through hole, indent, bevel, pole, grommet, or other structure. For example, as shown in FIG. 11, the phosphor layer 2 can include a red phosphor layer 22a, a green phosphor layer 22b and a blue phosphor layer 22c, which are formed in a concentric fashion with respect to the rotation axis X, respectively. In this case, when the semiconductor light source 5 emits the ultraviolet light and the phosphor wheel 11 including the phosphor layer 2 is rotated at a high speed, the semiconductor light source apparatus 1 can also emit the substantially white light with light excited by the red, green and blue phosphor layers 22a, 22b and 22c.

Figure 12:
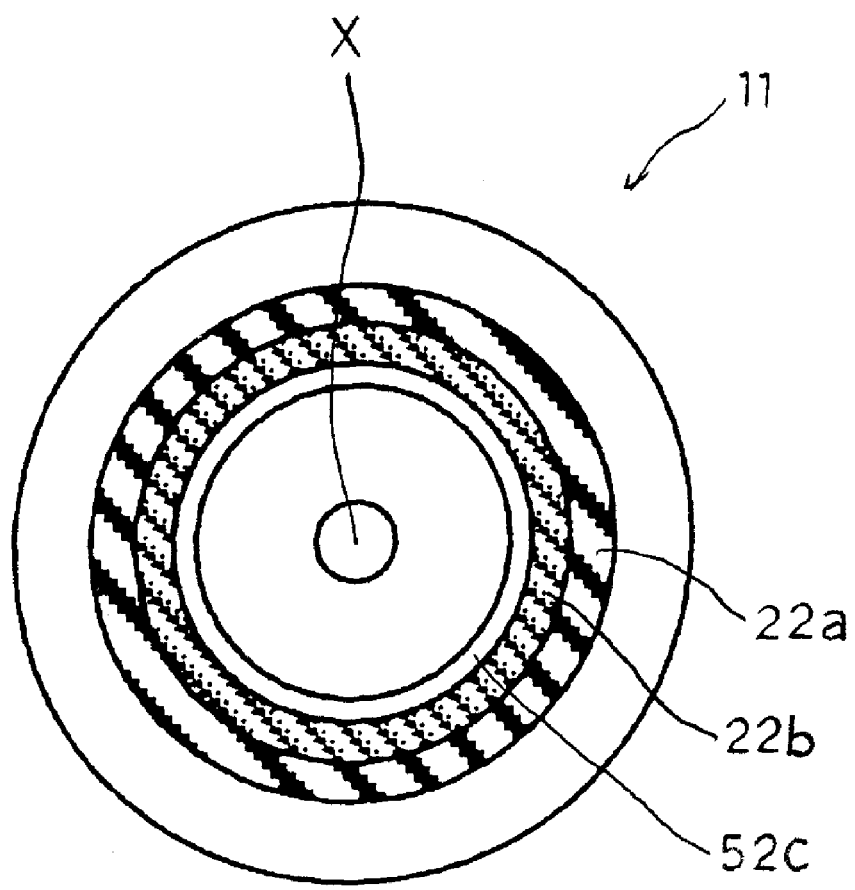
FIG. 12 is a schematic top view showing a phosphor wheel of a seventh variation of the second exemplary semiconductor light source apparatus.

The phosphor layer 2 shown in FIG. 12 can include the red phosphor layers 22a and the green phosphor layer 22b, which are formed in a ring shape. A cutout section 52c of the phosphor layer 2 can expose a part of the radiating substrate 6 from the red and green phosphor layers 22a and 22b. In this case, when the semiconductor light source 5 emits the blue light and the phosphor wheel 11 is rotated at a high speed, the semiconductor light source apparatus 1 can emit the substantially white light with light excited by the red and green phosphor layers 22a and 22b and blue light reflected by the cutout section 52c, which expose the part of the radiating substrate 6 from the red and green phosphor layers 22a and 22b. Therefore, the semiconductor light source 1 of the seventh variation shown in FIG. 12 can eliminate the blue phosphor layer 22c of the sixth variation shown in FIG. 11 while efficiently using the blue light that is not excited by the red and green phosphor layer 2a and 2b.

As described above, the phosphor layers 2 and 12 of the second exemplary semiconductor light source apparatus 1 can be rotated unlike the phosphor layers 2 of the first exemplary semiconductor light source apparatuses 10. A light-emitting area of the semiconductor light source 5 that is located on the phosphor layers 2 and 12 of the second exemplary semiconductor light source apparatuses 1 can be rotated in a circle on the phosphor layers 2 and 12 at a high speed. Thus, because the radiating efficiency of permanence of the phosphor layers 2 and 12 can improve even when a high power semiconductor light-emitting device such as a laser diode is used under a large current as the semiconductor light source 5, the disclosed subject matter can provide semiconductor light source apparatuses having high brightness and a high reliability.

Figure 13A:
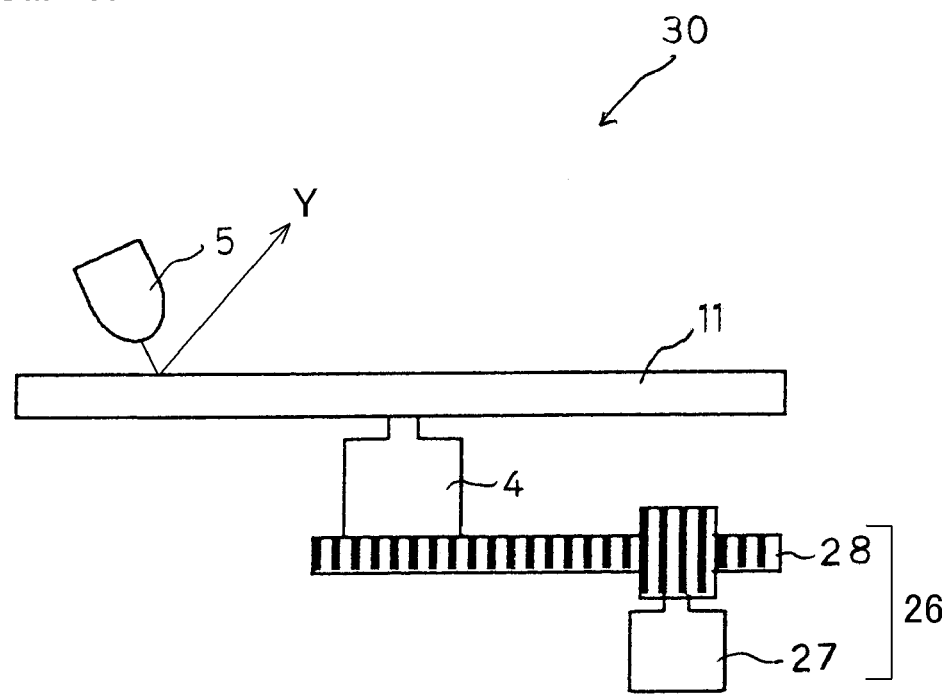
FIG. 13a is a schematic structural view showing a third exemplary embodiment of a semiconductor light source apparatus made in accordance with principles of the disclosed subject matter.
Figure 13B:
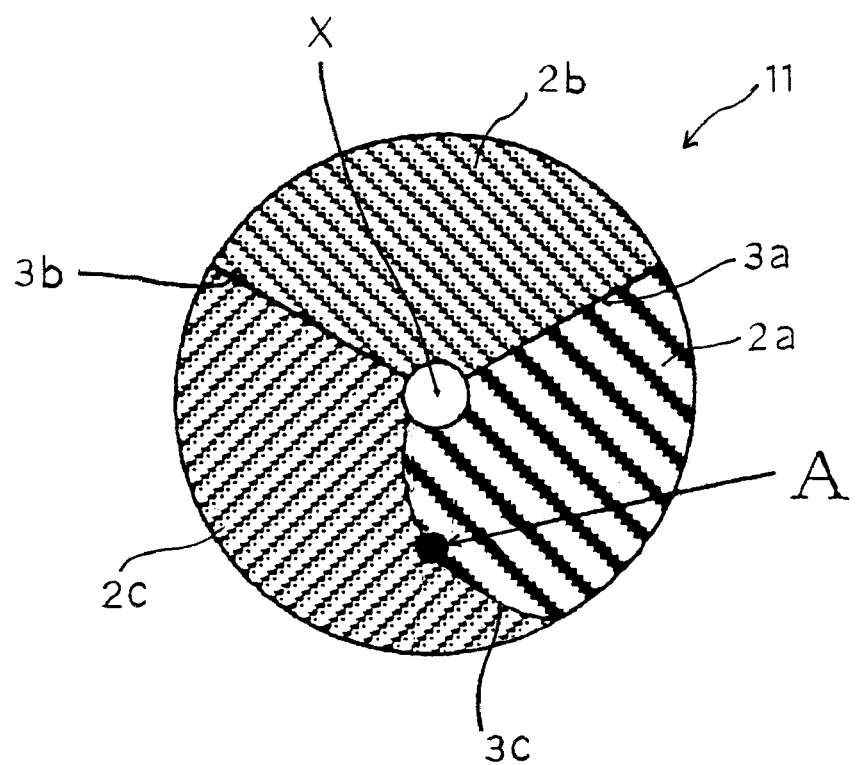

FIG. 13a is a schematic structural view showing a third exemplary embodiment of a semiconductor light source apparatus made in accordance with principles of the disclosed subject matter, and FIG. 13b is a schematic top view depicting a phosphor wheel of the third exemplary semiconductor light source shown in FIG. 13a. The semiconductor light source apparatus 30 can adjust a color tone of light by a moving module 26.

A phosphor wheel 11 of the third embodiment can include a red phosphor layer 2a formed in a fan shape; a green phosphor layer 2b formed in a fan shape; a blue phosphor layer 2c formed in a fan shape; a first boundary straight line 3a located between the red and green phosphor layers 2a and 2b; a second boundary straight line 3b located between the green and blue phosphor layers 2b and 2c; a boundary curved line 3c located between the blue and red phosphor layers 2c and 2a; and the semiconductor light source 5 having an optical axis Y that emits ultraviolet light.

The boundary curved line 3c can divide the red phosphor layer 2a and the blue phosphor layer 2c so that a ratio of an imaginary arc (that is part of an imaginary circle) located on (or travelling through) the red phosphor layer 2a to an imaginary arc located on (or travelling through) the blue phosphor layer 2c becomes larger as an intersection of the arc and the boundary curved line 3c approaches the rotation axis X when writing the arc with respect to (or concentrically about) the rotation axis X of the phosphor wheel 11. The semiconductor light source apparatus 30 can change a distance between the intersection of the optical axis Y of the semiconductor light source 5 and the phosphor wheel 11 and the rotation axis X of the phosphor wheel 11 by operation of the moving module 26, and therefore can change a color tone of light emitted from the light source apparatus 30 when the phosphor layer 11 is rotated by the motor 4.

The moving module 26 which changes the distance between the intersection of the optical axis Y of the semiconductor light source 5 and the phosphor wheel 11 and the rotation axis X of the phosphor wheel 11, when the semiconductor light source 5 is fixed, can include structure such that the phosphor wheel 11 can be moved in a direction perpendicular to the rotation axis X by a rack and pinion structure, which can change a rotation motion of a gear motor 27 into a linear motion of a slide gear 28. Accordingly, the light source apparatus 30 can adjust the distance between the intersection of the optical axis Y of the semiconductor light source 5 and the phosphor wheel 11 and the rotation axis X of the phosphor wheel 1 while it rotates the phosphor wheel 11. In this case, the moving module 26 can be structured by a helicioid method, and also can move the phosphor wheel 11 by a rotation motion including a rotation arm as compared with the linear motion.

The light source apparatus 30 can emit substantially white light with light excited by the three phosphor layers 2a, 2b and 2c, which excites the ultraviolet light emitted from the semiconductor light source 5 by rotating the phosphor wheel 1 by the motor 4. When the optical axis Y of the semiconductor light source 5 is located so as to pass through point A shown in FIG. 13c by the moving module 6, because each of the arcs on the phosphor layers 2a, 2b and 2c can be substantially equal, the light source apparatus 30 can emit a normal white light via the phosphor wheel 11.

Here, when the optical axis Y of the semiconductor light source 5 approaches from point A toward the rotation axis X of the phosphor wheel 11 by controlling the moving module 26, the color tone of light emitted from the light source apparatus 30 can change into a warm color including a red color more than other colors because a ratio of excited red light by the red phosphor layer 2a to excited blue light by the blue phosphor layer 2c increases.

On the contrary, when the optical axis Y of the semiconductor light source 5 moves from point A toward a circumference of the phosphor wheel 11 by controlling the moving module 26, the color tone of the light can change into a cool color including a blue color more than the other colors because a ratio of excited blue light by the blue phosphor layer 2c to the red light excited by the red phosphor layer 2a increases. Thus, the semiconductor light source apparatus 30 can continuously change the color tone of the white light from the warm color including a red color to the cool color including a blue color.

Variations of the third exemplary light source apparatus 30 will now be described. A first variation of the third exemplary light source apparatuses 30 can vary in the phosphor wheel 11. Accordingly, in the first variation, the phosphor wheel 11 will now be described with reference to FIG. 14. The phosphor wheel 11 can include: a red phosphor layer 2a wavelength-converting the blue light emitted from the semiconductor light source 5 into purple light; a green phosphor layer 42b wavelength-converting the blue light into blue-green light; a cutout section 42c exposing the radiating substrate 6 from the red and green phosphor layers 2a and 2b to reflect the blue light emitted from the semiconductor light source 5 without change of wavelength: a first boundary straight line 3a located between the red and green phosphor layers 2a and 2b; a second boundary straight line 3b located between the green phosphor layer 2b and the cutout section 42c; and a boundary curved line 3c located between the cutout section 42c and the red phosphor layer 2a.

Figure 14:
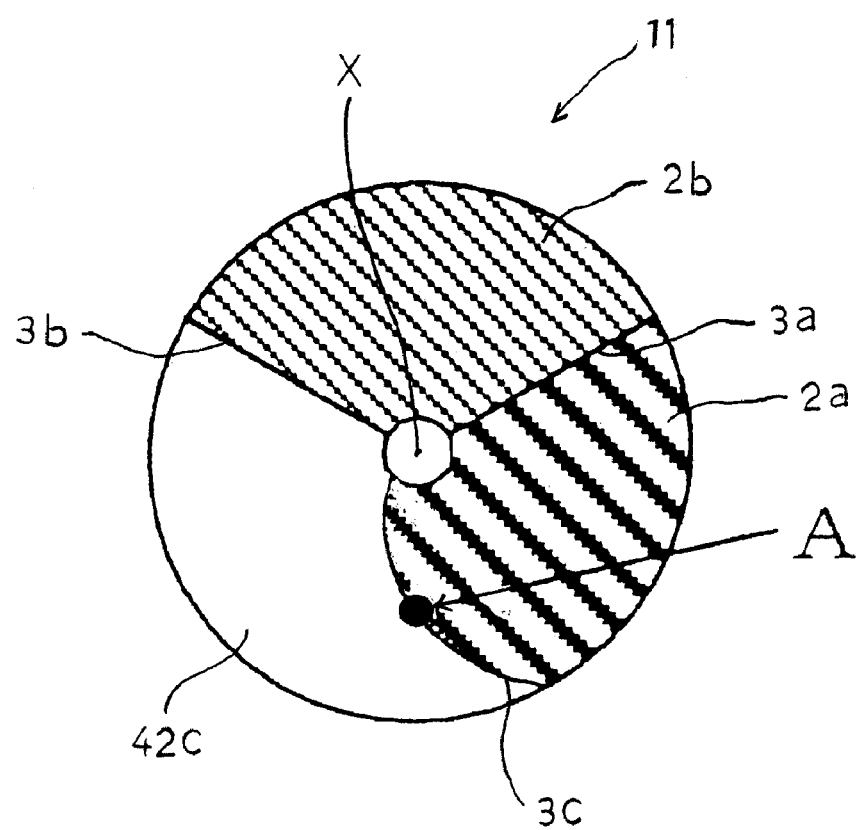
FIG. 14 is a schematic top view showing a phosphor wheel of a first variation of the third exemplary semiconductor light source.

The boundary curved line 3c can divide the red phosphor layer 42a and the cutout section 42c so that a ratio of an arc on the red phosphor layer 2a to an arc on the cutout section 42c becomes larger as an intersection of the arc and the boundary curved line 3c approaches the rotation axis X of the phosphor wheel 11 when writing (or centering) the arc with respect to the rotation axis X of the phosphor wheel 11 as shown in FIG. 14.

The semiconductor light source apparatus 30 including the phosphor wheel 11 of the first variation can also change the distance between the intersection of the optical axis Y of the semiconductor light source 5 and the phosphor wheel 11 and the rotation axis X of the phosphor wheel 11 by controlling the moving module 26, and therefore can also change a color tone of white light emitted from the semiconductor light source 5 via the phosphor wheel 11 like the semiconductor light source apparatus 30 of the third embodiment.

The semiconductor light source apparatus 30 including the phosphor wheel 11 can emit substantially white light with light blue reflected on the cutout section 42c in the blue light emitted from the semiconductor light source 5 and both purple light and blue-green light excited by the red and green phosphor layers 2a and 2b, which excite the blue light by rotating the phosphor wheel 11 with respect to the rotation axis X by the motor 4. When the optical axis Y of the semiconductor light source 5 is located so as to pass through point A shown in FIG. 14 by controlling the moving module 26, because each of arcs on the red and green phosphor layers 2a and 2b and the cutout section 42c can be substantially equal, the semiconductor light source apparatus 30 can emit a normal white light via the phosphor wheel 11.

However, when the optical axis Y of the semiconductor light source 5 approaches from point A toward the rotation axis X of the phosphor wheel 11 by controlling the moving module 26, the color tone of the white light emitted from the semiconductor light source apparatus 30 can change into a warm color including a red color more than other colors because a ratio of the purple light excited by the red phosphor layer 2a to the blue light reflected by the cutout section 42c increases.

On the contrary, when the optical axis Y of the semiconductor light source 5 moves from point A toward a circumference of the phosphor wheel 11 by controlling the moving module 26, the color tone of the white light can change into a cool color including a blue color more than the other colors because a ratio of the blue light reflected on the cutout section 42c to the purple light excited by the red phosphor layer 2a increases.

Therefore, the semiconductor light source 30 including the phosphor wheel 11 of the first variation can also change the color tone of the white light continuously from the warm color to the cool color. The semiconductor light source 30 of the first variation shown in FIG. 14 can eliminate the blue phosphor layer 3c of the phosphor wheel 11 shown in FIG. 13b while efficiently using the blue light that is not excited by the red and green phosphor layer 2a and 2b.

Figure 15:
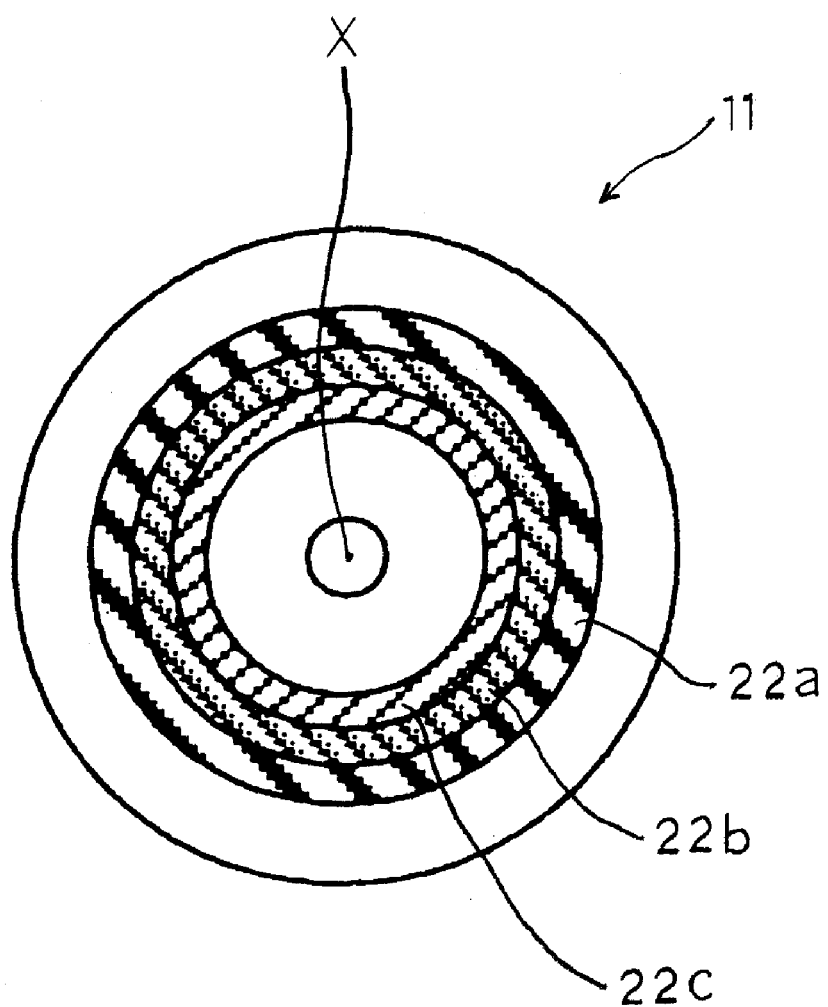
FIG. 15 is a schematic top view showing a phosphor wheel of a second variation of the third exemplary semiconductor light source.

FIG. 15 is a schematic top view showing a phosphor wheel of a second variation of the third exemplary semiconductor light source. The phosphor wheel 11 can include: a red phosphor layer 22a formed in a ring shape and the red phosphor layer 2a wavelength-converting the ultraviolet light emitted from the semiconductor light source 5 into red light; a green phosphor layer 22b formed in a ring shape so as to be adjacent to the red phosphor layer 22a and the green phosphor layer 22b wavelength-converting the ultraviolet light into green light; and the blue phosphor layer 22c formed in a ring shape so as to be adjacent to the green phosphor layer 22b and the blue phosphor layer 22c wavelength-converting the ultraviolet light into blue light.

The semiconductor light source apparatus 30 including the phosphor wheel 11 of the second variation can emit substantially white light with light excited by the red, green and blue phosphor layers 22a, 22b and 22c by illuminating the ultraviolet light emitted from the semiconductor light source 5 on the phosphor layers 22a, 22b and 22c when the phosphor wheel 11 is rotated at a substantially right angle with respect to the rotation axis X thereof by the motor 4.

Here, when the optical axis Y of the semiconductor light source 5 approaches the rotation axis X of the phosphor wheel 11 by controlling the moving module 26, the color tone of the white light emitted from the light source apparatus 30 can change into a cool color including a blue color more than other colors because a ratio of the blue light excited by the blue phosphor layer 22c to the red light excited by the red phosphor layer 22a increases.

On the other hand, when the optical axis Y of the semiconductor light source 5 moves toward the circumference of the phosphor wheel 11 by controlling the moving module 26, the color tone of the white light can change into a warm color including a red color more than the other colors because a ratio of the red light excited by the red phosphor layer 22a to the blue light excited by the blue phosphor layer 22c increases. Therefore, the semiconductor light source 30 including the phosphor wheel 11 of the second variation can also change the color tone of the white light continuously from the warm color to the cool color.

Figure 16:
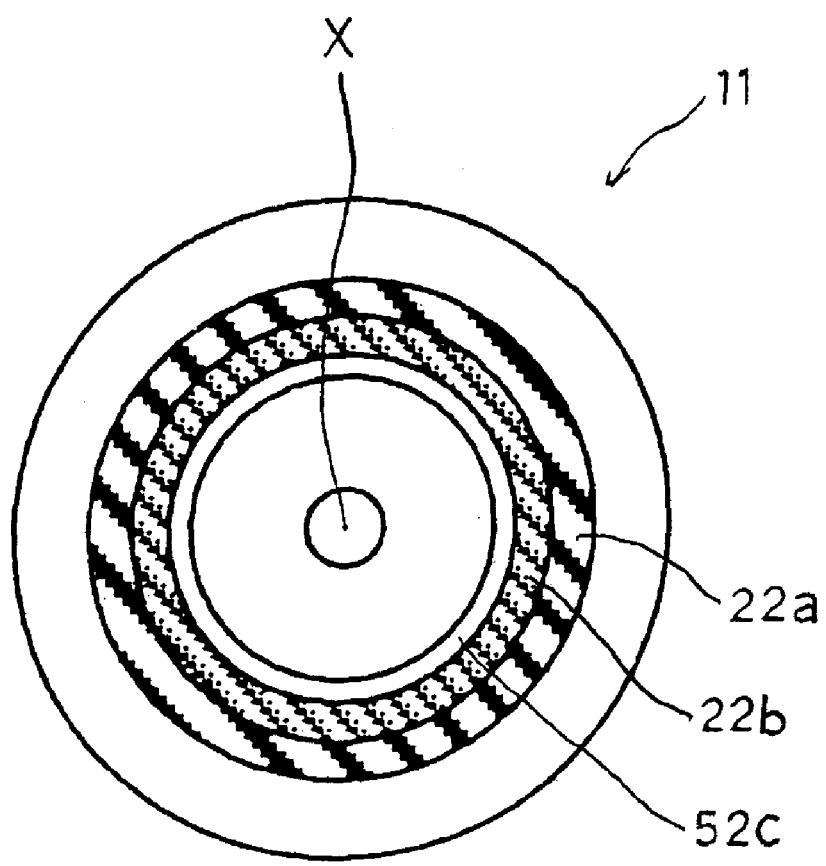
FIG. 16 is a schematic top view showing a phosphor wheel of a third variation of the third exemplary semiconductor light source.

FIG. 16 is a schematic top view showing a phosphor wheel of a third variation of the third exemplary semiconductor light source. The phosphor wheel 11 can include: the red phosphor layer 22a formed in a ring shape and the red phosphor layer 22a wavelength-converting the blue light emitted from the semiconductor light source 5 into purple light; the green phosphor layer 22b formed in a rig shape and located adjacent to the red phosphor layer 22a, and the green phosphor layer 22b wavelength-converting the blue light into blue-green light; and a cutout section 52c formed in a ring shape and located adjacent to the green phosphor layer 22b, and the cutout section 52c exposing the radiating substrate 6 from the red and green phosphor layers 22a and 22b to reflect the blue light emitted from the semiconductor light source 5 without change of wavelength.

When the semiconductor light source 5 emit the blue light on the red and green phosphor layers 22a and 22b and the cutout section 52c that exposes the radiating substrate 6 from the phosphor layers 22a and 22b, the semiconductor light source apparatus 30 the phosphor wheel 11 can emit substantially white light with the blue light reflected on the cutout section 52c and the purple and blue-green lights excited by the red and green phosphor layers 22a and 22b by rotating the phosphor wheel 11 at a substantially right angle with respect to the rotation axis X by the motor 4.

In this case, when the optical axis Y of the semiconductor light source 5 approaches the rotation axis X of the phosphor wheel 11 by controlling the moving module 26, the color tone of the white light emitted from the semiconductor light source apparatus 30 can change into a cool color including a blue color more than other colors because a ratio of the blue light reflected from the cutout section 52c to the purple light excited by the red phosphor layer 22a increases.

On the contrary, when the optical axis Y of the semiconductor light source 5 moves toward the circumference of the phosphor wheel 11 by controlling the moving module 26, the color tone of the white light can change into a warm color including a red color more than the other colors because a ratio of the purple light excited by the red phosphor layer 22a to the blue light reflected from the cutout section 52c increases.

Therefore, the semiconductor light source 30 including the phosphor wheel 11 of the third variation can also change the color tone of the white light continuously from the warm color to the cool color. The semiconductor light source 30 of the third variation shown in FIG. 16 can eliminate the blue phosphor layer 22c of the phosphor wheel 11 of the second variation shown in FIG. 15 while it can efficiently use the blue light that is not excited by the red and green phosphor layer 2a and 2b.

Additionally, in the reflection type phosphor wheel 11, the red and green phosphor layers 22a and 22b can be disposed on the radiating substrate 6 having a high reflectivity and a high thermal conductivity. Accordingly, the reflection type semiconductor light source apparatus 30 of the third variation can illuminate the white light with high efficiency by completely reflecting and mixing the blue light and the excited purple and blue-green lights while it can adjust the color tone of the white light.

As described above, because the phosphor wheel 11 of the third embodiments can be moved in a direction perpendicular to the rotation axis X thereof by the moving module 26, the semiconductor light source apparatuses 30 of the third embodiments can adjust a color tone of the illumination light having a large amount of light intensity. Thus, the disclosed subject matter can include providing adjustable semiconductor light source apparatuses, in which the color tone of the illumination light having a large amount of light intensity can be adjusted by the moving module 26.

Figure 17:
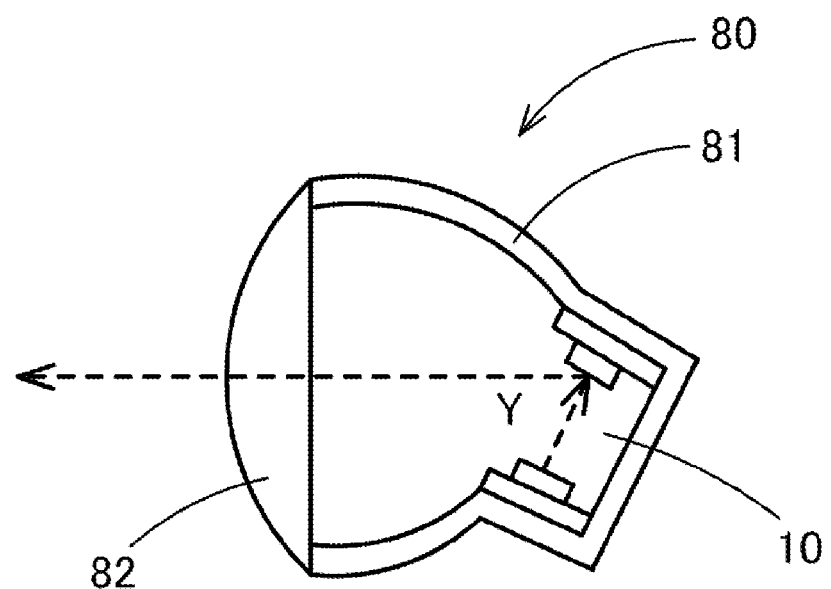
FIG. 17 is a schematic structural view showing an exemplary embodiment of a lighting unit using an exemplary semiconductor light source apparatus of the disclosed subject matter.

Lighting units using the above-described semiconductor light source apparatuses 10 and 30 are described with reference to FIG. 17. A lighting unit 80 including the semiconductor light source apparatus 10 can include a housing 81 attaching the semiconductor light source 10 thereto and an optical lens 82 located adjacent to the housing 8. In this case, the optical lens 82 can be located in front of the semiconductor light source apparatus 10 so as to match light distributions for various lighting units.

The optical lens 82 can include a projector lens having an optical axis, which is composed of a convex lens. When the optical axis of the projector lens substantially corresponds to the optical axis Y of the semiconductor light source 5, the lighting unit 80 including the projector lens can provide a favorable light distribution in focus for a projector, a stage lighting, etc. In addition, the optical lens 82 can include a zoom lens having an optical axis, which is structured by at least one convex lens and at least one concave lens.

When the optical axis of the zoom lens corresponds to the substantially optical axis Y of the semiconductor light source 5, because the light unit 80 can provide a favorable light distribution in focus, the lighting unit 80 including the zoom lens can be used for a lighting system having a zoom function such as a projector, stage lighting, etc. Thus, the disclosed subject matter can provide adjustable high power lighting units having high brightness and favorable light distributions by using a high power semiconductor light source, which can be used for various lighting units such as a projector, a stage lighting, general lighting, etc.

Various modifications of the above disclosed embodiments can be made without departing from the spirit and scope of the presently disclosed subject matter. For example, cases where the above-described phosphor wheels are formed in the substantially circular shape are described. However, the phosphor wheels cannot be limited to this shape and can be formed in various shapes such as an ellipsoidal shape and the like. In addition, the specific arrangement between components can vary between different applications, and several of the above-described features can be used interchangeably between various embodiments depending on a particular application of the device.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A semiconductor light source apparatus, comprising:
a substrate having a mounting surface;
at least one phosphor layer disposed on the mounting surface of the substrate via an adhesive material, and the at least one phosphor layer composed of at least one of a glass phosphor and a phosphor ceramic which includes substantially no resin component; and
a semiconductor light source having an optical axis and a light-emitting area, the semiconductor light source located adjacent to the at least one phosphor layer so that the optical axis of the semiconductor light source intersects with the mounting surface of the substrate at an angle between 0 degrees and 90 degrees while the light-emitting area of the semiconductor light source is located on the at least one phosphor layer to wavelength-convert light emitted from the semiconductor light source by the at least one phosphor layer, and wherein the light source is configured such that light emitted from the semiconductor light source travelling along the optical axis changes direction toward the at least one phosphor layer after being reflected from at least one of the substrate and the adhesive material.

2. The semiconductor light source apparatus according to claim 1, wherein the semiconductor light source is a blue light-emitting device and the at least one phosphor layer is selected from the group consisting of a yellow phosphor ceramic, and two phosphor layers of a red phosphor layer and a green phosphor layer.

3. The semiconductor light source apparatus according to claim 1, wherein the semiconductor light source is an ultraviolet light-emitting device and the at least one phosphor layer includes at least one of a red phosphor, a green phosphor and a blue phosphor.

4. The semiconductor light source apparatus according to claim 1, further comprising:
   a motor having a rotation axis structure, and wherein the substrate has a rotation axis structure, and the rotation axis structure of the substrate is connected with the rotation axis structure of the motor so that the mounting surface of the substrate is rotated in a plane by the motor, the plane being at a substantially right angle with respect to the rotation axis structure of the substrate.

5. A lighting unit including the semiconductor light source apparatus according to claim 1, further comprising:
   a housing located so as to cover the semiconductor light source apparatus; and
   a projector lens having an optical axis located adjacent to the housing so that the optical axis of the projector lens substantially corresponds to the optical axis of the semiconductor light source.

6. The semiconductor light source apparatus according to claim 1, wherein the at least one phosphor layer consists essentially of at least one of a glass phosphor and a phosphor ceramic.

7. A semiconductor light source apparatus, comprising:
   a motor having a rotation axis structure;
   a substrate having a mounting surface and a rotation axis structure, and the rotation axis structure of the substrate being connected to the rotation axis structure of the motor so that the mounting surface of the substrate is rotated in a plane by the motor, the plane being at a substantially right angle with respect to the rotation axis structure of the substrate;
   at least one phosphor layer disposed on the mounting surface of the substrate via an adhesive material, and the at least one phosphor layer composed of at least one of a glass phosphor and a phosphor ceramic which includes substantially no resin component; and
   a semiconductor light source having an optical axis and a light-emitting area, the semiconductor light source located adjacent to the at least one phosphor layer so that the optical axis of the semiconductor light source intersects with the mounting surface of the substrate at an angle between 0 degrees and 90 degrees while the light-emitting area of the semiconductor light source is located on the at least one phosphor layer to wavelength-convert light emitted from the semiconductor light source by the at least one phosphor layer, and wherein the light source is configured such that light emitted from the semiconductor light source travelling along the optical axis changes direction toward the at least one phosphor layer after being reflected from at least one of the substrate and the adhesive material.

8. The semiconductor light source apparatus according to claim 7, further comprising:
   a moving module being connected to the motor, wherein the moving module is configured to adjust a distance between the rotation axis structure of the substrate and an intersection of the optical axis of the semiconductor light source and the mounting surface of the substrate.

9. The semiconductor light source apparatus according to claim 8, wherein the semiconductor light source is an ultra-violet light-emitting device and the at least one phosphor layer includes a red phosphor layer, a green phosphor layer, and a blue phosphor layer that are formed in a fan shape, respectively, and wherein a ratio of a first arc on the red phosphor layer to a second arc on the blue phosphor layer varies according to a location of intersection of each arc with a boundary between the red phosphor layer and the blue phosphor layer when each arc is part of an imaginary circle centered at the rotation axis structure of the substrate, and the first arc is an entire portion of the imaginary circle located in the red phosphor layer and the second arc is an entire portion of the imaginary circle located in the blue phosphor layer.

10. The semiconductor light source apparatus according to claim 7, wherein the substrate includes a cavity having a bottom surface and the mounting surface of the substrate is formed on the bottom surface of the cavity.

11. The semiconductor light source apparatus according to claim 7, wherein the semiconductor light source is a blue light-emitting device and the at least one phosphor layer is a yellow phosphor layer.

12. The semiconductor light source apparatus according to claim 7, wherein the semiconductor light source is a blue light-emitting device and the at least one phosphor layer includes a red phosphor layer and a green phosphor layer that are formed in at least one of a two-layer structure and a semicircular shape, respectively.

13. The semiconductor light source apparatus according to claim 7, wherein the semiconductor light source is an ultraviolet light-emitting device and the at least one phosphor layer is configured with a red phosphor layer, a green phosphor layer and a blue phosphor layer that are configured in a fan shape, respectively.

14. The semiconductor light source apparatus according to claim 7, wherein the semiconductor light source is an ultra-violet light-emitting device and the at least one phosphor layer is configured with a red phosphor layer, a green phosphor layer, and a blue phosphor layer that are respectively formed in a concentric fashion with respect to the rotation axis structure of the substrate, and wherein the green phosphor layer is located between the red phosphor layer and the blue phosphor layer.

15. A lighting unit including the semiconductor light source apparatus according to claim 7, further comprising:
   a housing located so as to cover the semiconductor light source apparatus; and
   a projector lens having an optical axis located adjacent to the housing so that the optical axis of the projector lens substantially corresponds to the optical axis of the semiconductor light source.

16. A semiconductor light source apparatus, comprising:
   a motor having a rotation axis structure:
   a substrate having a mounting surface and a rotation axis structure, and the rotation axis structure of the substrate being connected to the rotation axis structure of the motor so that the mounting surface of the substrate is rotated in a plane by the motor, the plane being at a substantially right angle to the rotation axis structure of the substrate;
   at least one phosphor layer disposed on the mounting surface of the substrate via an adhesive material and including a cutaway so as to expose a part of the substrate from the at least one phosphor layer, and the at least one phosphor layer composed of at least one of a glass phosphor and a phosphor ceramic including a substantially no resin component; and
   a blue light-emitting device having an optical axis and a light-emitting area, the blue light-emitting device located adjacent to the at least one phosphor layer so that the optical axis of the blue light-emitting device intersects with the mounting surface of the substrate at an angle between 0 and 90 degrees while the light-emitting area of the blue light-emitting device is located on the part of the substrate exposed from the at least one phosphor layer to reflect blue light emitted from the blue light-emitting device, and the light-emitting area of the blue light-emitting device is located on the at least one phosphor layer to wavelength-convert blue light emitted from the blue light-emitting device by the at least one phosphor layer; and the blue light-emitting device is configured such that light emitted along the optical axis of the blue light-emitting device changes direction toward the at least one phosphor layer after being reflected from the substrate.

17. The semiconductor light source apparatus according to claim 16, further comprising:
a moving module being connected to the motor, wherein the moving module is configured to adjust a distance between the rotation axis structure of the substrate and an intersection of the optical axis of the light emitting device and the mounting surface of the substrate.

18. The semiconductor light source apparatus according to claim 17, wherein the at least one phosphor layer is configured with a red phosphor layer and a green phosphor layer that are formed in a fan shape, respectively, and wherein a ratio of a first arc on the red phosphor layer to a second arc on the part of the substrate exposed from the red and green phosphor layers varies according to a location of intersection of the arc with a boundary between the red phosphor layer and the part of the substrate when each arc is part of an imaginary circle centered at the rotation axis structure of the substrate.

19. The semiconductor light source apparatus according to claim 16, wherein the at least one phosphor layer is configured with a red phosphor layer and a green phosphor layer that are respectively formed in a fan shape so that the part of the substrate exposed from the red and green phosphor layers is formed in a fan shape.

20. The semiconductor light source apparatus according to claim 16, wherein the at least one phosphor layer is configured with a red phosphor layer and a green phosphor layer that are respectively formed in a concentric fashion with respect to the rotation axis structure of the substrate, and wherein the green phosphor layer is located between the red phosphor layer and the part of the substrate exposed from the at least one phosphor layer.

21. A lighting unit including the semiconductor light source apparatus according to claim 16, further comprising:
a housing located so as to cover the semiconductor light source apparatus; and
a projector lens having an optical axis located adjacent to the housing so that the optical axis of the projector lens substantially corresponds to the optical axis of the semiconductor light source.

22. A semiconductor light source apparatus, comprising:
a motor having a rotation axis structure;
a substrate having a rotation axis structure and including a cavity having a bottom surface, and the rotation axis structure of the substrate being connected to the rotation axis structure of the motor so that when the motor is operated, the bottom surface of the cavity is rotated in a rotational plane that is at a substantially right angle to the rotation axis structure of the substrate;
at least one glass phosphor layer disposed adjacent the bottom surface of the cavity of the substrate; and
a semiconductor light source having an optical axis and a light-emitting area, the semiconductor light source located adjacent to the at least one glass phosphor layer so that the optical axis of the semiconductor light source intersects with the bottom surface of the cavity of the substrate at an angle between 0 and 90 degrees while the light-emitting area of the semiconductor light source is located on the at least one glass phosphor layer to wavelength-convert light emitted from the semiconductor light source by the at least one glass phosphor layer, and wherein the semiconductor light source is configured such that light emitted from the semiconductor light source and travelling along the optical axis of the semiconductor light source changes in direction toward the at least one glass phosphor layer after being reflected from the bottom surface of the cavity of the substrate.

23. The semiconductor light source apparatus according to claim 22, wherein the semiconductor light source is a blue light-emitting device and the at least one glass phosphor layer is a yellow glass phosphor layer.

24. A lighting unit including the semiconductor light source apparatus according to claim 22, further comprising:
a housing located so as to cover the semiconductor light source apparatus; and
a projector lens having an optical axis located adjacent to the housing so that the optical axis of the projector lens substantially corresponds to the optical axis of the semiconductor light source.

* * * * *